(12) United States Patent
Yamashita et al.

(10) Patent No.: US 8,816,676 B2
(45) Date of Patent: Aug. 26, 2014

(54) POSITION SENSOR

(71) Applicant: Honda Motors Co., Ltd., Tokyo (JP)

(72) Inventors: Hideaki Yamashita, Saitama (JP); Yasuhiro Ijichi, Saitama (JP); Hiroshi Takei, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 162 days.

(21) Appl. No.: 13/675,752

(22) Filed: Nov. 13, 2012

(65) Prior Publication Data

US 2013/0133411 A1 May 30, 2013

(30) Foreign Application Priority Data

Nov. 29, 2011 (JP) ................... 2011-261027

(51) Int. Cl.

| | | |
|---|---|---|
| *G01B 7/14* | (2006.01) | |
| *G01M 13/02* | (2006.01) | |
| *F16H 59/10* | (2006.01) | |
| *F16H 63/42* | (2006.01) | |
| *F16H 63/20* | (2006.01) | |
| *F16H 59/04* | (2006.01) | |

(52) U.S. Cl.
CPC ............ *G01M 13/02* (2013.01); *F16H 59/105* (2013.01); *F16H 63/20* (2013.01); *F16H 63/42* (2013.01); *F16H 59/042* (2013.01); *G01M 13/022* (2013.01)
USPC ............ 324/207.22; 324/207.11; 324/207.13; 324/207.23; 74/473.1; 74/473.3; 340/456; 701/64

(58) Field of Classification Search
CPC ..... G01D 5/145; G01D 5/147; G01D 5/2457; G01P 3/487; G01P 3/443; F16H 63/42; F16H 63/20; F16H 63/30; F16H 63/3009; F16H 59/105; F16H 59/042; F16H 59/10; F16H 59/0204; F16H 59/0217; F16H 59/44; F16H 59/70; F16H 59/02078; F16H 61/0293; F16H 61/18; F16H 61/24; F16H 61/0213
USPC ............... 324/207.11–207.26, 206; 74/473.1, 74/473.3, 337.5; 340/456, 686; 701/64, 62
See application file for complete search history.

(56) References Cited

U.S. PATENT DOCUMENTS 6,089,118 A * 7/2000 Ishii et al. .................. 74/473.18
6,345,548 B1 * 2/2002 Ohashi et al. ............... 74/336 R
(Continued)

FOREIGN PATENT DOCUMENTS

JP 03-157568 7/1991
JP 05-209683 8/1993
(Continued)

*Primary Examiner* — Tung X Nguyen
*Assistant Examiner* — Thang Le
(74) *Attorney, Agent, or Firm* — Squire Patton Boggs (US) LLP

(57) ABSTRACT

The position sensor includes a shift lever used to select one of five ranges P, R, N, D, and B, fixed contacts corresponding to the ranges P, R, N, D, and B, and movable contacts configured to be electrically connected to the fixed contacts. The fixed contacts include regular fixed contacts, first backup fixed contacts, and second backup fixed contacts. The first and second backup fixed contacts have their lengths in the moving direction of the movable contacts configured to be longer than the length of the regular fixed contact that corresponds to the first and second backup fixed contacts.

7 Claims, 2 Drawing Sheets

(56) References Cited

U.S. PATENT DOCUMENTS

| | | | |
|---|---|---|---|
| 6,675,668 B2* | 1/2004 | Schamscha | 74/340 |
| 7,093,511 B2* | 8/2006 | Norum et al. | 74/335 |
| 7,314,427 B2* | 1/2008 | Sakai et al. | 477/116 |
| 7,467,563 B2* | 12/2008 | Drabek et al. | 74/335 |
| 7,503,876 B2* | 3/2009 | Kitamura et al. | 477/125 |
| 7,566,289 B2* | 7/2009 | Inoue et al. | 477/34 |
| 2005/0096821 A1* | 5/2005 | Tamaru et al. | 701/51 |
| 2006/0065068 A1* | 3/2006 | Mizuno et al. | 74/473.1 |
| 2009/0042691 A1* | 2/2009 | Matsubara et al. | 477/80 |
| 2012/0000309 A1* | 1/2012 | Takagi et al. | 74/473.1 |

FOREIGN PATENT DOCUMENTS

| | | |
|---|---|---|
| JP | 06-109110 | 4/1994 |
| JP | 07-012216 | 1/1995 |
| JP | 07-035225 | 2/1995 |
| JP | 7-127723 | 5/1995 |
| JP | 2666645 B2 | 6/1997 |
| JP | 10-297307 | 11/1998 |
| JP | 2008-032155 | 2/2008 |
| JP | 2009-162287 | 7/2009 |
| JP | 2009-248912 | 10/2009 |

* cited by examiner

POSITION SENSOR

BACKGROUND OF THE INVENTION

1. Field of the Invention

The present invention relates to a position sensor which detects the range of a transmission selected by the shift lever of a vehicle.

2. Description of the Related Art

A transmission mounted on a vehicle generally has a neutral range in which an input driving force is not transmitted to the output side of the transmission, a reverse range for causing the vehicle to move backward, a drive range for causing the vehicle to move forward, and other ranges. A driver of the vehicle selects the ranges as appropriate in accordance with the driving situations.

Some of such transmissions include a plurality of hydraulically actuated mechanisms such as a clutch, a brake, and so on. These hydraulically actuated mechanisms are configured to be switchable between a transmission state where the driving force is transmitted and an open state where the transmission state is released, according to whether oil pressure is supplied or not.

In this transmission, the states of the respective hydraulically actuated mechanisms are set for each of the ranges of the transmission. More specifically, when a certain range of the transmission is selected by the shift lever mounted on the vehicle, the states of the hydraulically actuated mechanisms are switched to the predetermined states such that the range of the transmission is switched to the selected range.

Conventionally, as means for switching the states of the hydraulically actuated mechanisms in accordance with the selected range of the transmission, a manual valve has been used. This manual valve has output ports corresponding respectively to the ranges of the transmission. The manual valve is mechanically connected to the shift lever via wire and the like, so that the manual valve moves in correspondence with the manipulation of the shift lever. At this time, the manual valve outputs oil pressure from the output port corresponding to the range that has been selected by the driver with the shift lever.

Such a manual valve is required to have a plurality of lands corresponding to the number of ranges in the shift lever. As the number of ranges increases, the manual valve needs to be increased in length, hindering downsizing thereof.

In recent years, with an increasing demand for downsized vehicles, it has been considered to switch the ranges of the transmission without the use of the manual valve which is difficult to downsize. As a vehicle using no manual valve, there is known a vehicle, as disclosed in Japanese Patent No. 2666645, which includes four solenoid valves that switch whether to supply oil pressure or not. These solenoid valves have their on and off states switched in accordance with the range selected by the shift lever. In this vehicle using no manual valve working in correspondence with the shift lever, an ECU detects the state of a switch that works in correspondence with the shift lever, and switches the on and off states of the respective solenoid valves.

In the case of using a conventional manual valve, which works in correspondence with the shift lever, when a range is selected by the shift lever, oil pressure is supplied to the hydraulically actuated mechanism(s) corresponding to the selected range without fail. In the case of detecting a range on the basis of the state of an electrical switch, however, when a short circuit or break occurs in the contacts of the switch, the ECU may not be able to detect the range selected by the shift lever. In order to prevent such an undesirable situation, it should be necessary to detect abnormalities in the contacts.

SUMMARY OF THE INVENTION

In view of the foregoing, an object of the present invention is to provide a position sensor which is configured to detect a range selected by a shift lever on the basis of a contact between electric contacts, and which is capable of detecting occurrence of abnormality such as a short circuit or break in the contacts.

The present invention provides a position sensor that includes a shift lever manipulated to select one of a plurality of ranges, and a plurality of contacts corresponding to the plurality of ranges, the plurality of contacts including movable contacts and fixed contacts, the movable contact being configured to move in accordance with the manipulation of the shift lever, the fixed contact becoming conductive with the movable contact when the movable contact moves and comes into contact with the fixed contact, the position sensor detecting that the range corresponding to the movable and fixed contacts that have become conductive with each other has been selected by the shift lever, wherein the plurality of contacts are classified as one or more regular contacts and one or more backup contacts that are different from the regular contacts, the regular contacts corresponding respectively to the plurality of ranges, the backup contacts corresponding respectively to one or more prescribed ranges among the plurality of ranges, and each of the one or more backup contacts is configured such that the backup contact makes a transition from a non-conductive state to a conductive state before the regular contact corresponding to the same range as the backup contact makes a transition from the non-conductive state to the conductive state, and such that the backup contact makes a transition from the conductive state to the non-conductive state after the regular contact corresponding to the same range as the backup contact makes a transition from the conductive state to the non-conductive state, the non-conductive state being the state where the movable contact is not conductive with the fixed contact, the conductive state being the state where the movable contact is conductive with the fixed contact.

According to the present invention, it is configured such that in the case where a prescribed range is selected by the shift lever, when the regular contact corresponding to the prescribed range is in the conductive state, the backup contact corresponding to the prescribed range is in the conductive state without fail. Therefore, when the backup contact is in the non-conductive state while the regular contact is in the conductive state, it can be determined that the regular contact has short-circuited or the backup contact has broken. If it were not configured such that when the regular contact is in the conductive state, the backup contact corresponding to the same range as the regular contact is in the conductive state without fail, in the case where the regular contact is in the conductive state while the backup contact is in the non-conductive state due to a manufacturing error in the contact length (the difference between the "designed length of a contact" and the "actual length of the manufactured contact"), it cannot be determined that one of the contacts has an abnormality. With the present invention, it is possible to check for abnormalities in the contacts.

In the present invention, it is preferable that each of the one or more backup contacts includes a first backup contact and a second backup contact which correspond to one and same range. With this configuration, each of the prescribed ranges is provided with a triple system having three contacts of the regular contact, the first backup contact, and the second backup contact. This increases the probability that, even if an abnormality occurs in one contact, the range selected by the shift lever can be detected accurately with the remaining two contacts.

In the present invention, it is preferable that the ranges include at least two drive ranges used when the vehicle is caused to travel, and at least two non-drive ranges used when the vehicle is being stopped, and that the prescribed ranges include only the drive ranges. When the vehicle behaves in a manner different from the range being selected by the shift lever, broadly the following two cases are conceivable: the case where the vehicle travels while the non-drive range is being selected; and the case where the vehicle does not travel (i.e., the vehicle maintains the stopped state or is moving under its own inertia) while the drive range is being selected. It is desired to prevent the occurrence of particularly the former case. When the prescribed range for which the backup contact is provided is set to be the drive range, it is possible to suppress the occurrence of the case that should be more suppressed. It is also possible to reduce the number of parts compared to the case where the backup contacts are provided for all the ranges.

In the present invention, it is preferable that the position sensor further includes a control device, wherein when the first backup contact and the second backup contact corresponding to a first target range are in the conductive state, the first target range being one of the one or more prescribed ranges, and the regular contact corresponding to the first target range is in the non-conductive state, the control device detects that one of the non-drive ranges has been selected by the shift lever in the case where the regular contact corresponding to one of the non-drive ranges is in the conductive state, and the control device detects that the first target range has been selected by the shift lever in the case where the regular contact corresponding to the first target range has made a transition from the non-conductive state to the conductive state.

As previously described, the backup contacts (more specifically, the first and second backup contacts) are configured such that they are in the conductive state without fail when the regular contact corresponding to the same range as the backup contacts is in the conductive state. This means that there is a possibility that even when the first and second backup contacts are in the conductive state, the regular contact corresponding to the same range as the backup contacts is in the non-conductive state.

Thus, in the case where the first and second backup contacts corresponding to the first target range are in the conductive state, the regular contact corresponding to the first target range is in the non-conductive state, and the regular contact corresponding to one of the non-drive ranges is in the conductive state, it is unclear whether "the first and second backup contacts corresponding to the first target range have both short-circuited" or "the regular contact corresponding to one of the non-drive ranges has short-circuited". If it were configured at this time to detect that the range corresponding to the first and second backup contacts that are in the conductive state had been selected, in the event that the first and second backup contacts have actually short-circuited, the vehicle would travel despite the fact that the driver has selected a non-drive range by the shift lever. Accordingly, at this stage, the control device detects that one of the non-drive ranges has been selected by the shift lever.

Thereafter, when the regular contact corresponding to the first target range makes a transition to the conductive state, the regular contact, the first backup contact, and the second backup contact corresponding to the first target range attain the conductive state. In this case, it is conceivable that "the regular contact, the first backup contact, and the second backup contact corresponding to the first target range have all short-circuited" or that "the regular contact corresponding to one of the non-drive ranges has short-circuited". It is hardly likely that all the contacts have short-circuited, and therefore, it is considered that the regular contact corresponding to one of the non-drive ranges has short-circuited. Accordingly, in such a case, the control device detects that the first target range has been selected by the shift lever.

In this manner, when it is likely that a non-drive range has been selected, the control device can detect that the non-drive range has been selected by the shift lever. When it is hardly likely that a non-drive range has been selected, the drive range allowing the vehicle to travel is selected. This reduces the possibility that the vehicle remains stopped.

In the present invention, it is preferable that the position sensor further includes a control device, wherein when the first backup contact and the second backup contact corresponding to a second target range are in the conductive state, the second target range being one of the one or more prescribed ranges, and the regular contact corresponding to the second target range is in the non-conductive state, the control device detects that one of the non-drive ranges has been selected by the shift lever in the case where the regular contact corresponding to a third target range is in the conductive state, the third target range being one of the non-drive ranges, and the control device detects that the first backup contact and the second backup contact corresponding to the second target range have abnormalities in the case where the regular contact corresponding to the third target range has made a transition from the conductive state to the non-conductive state and the regular contact corresponding to a fourth target range has made a transition from the non-conductive state to the conductive state, the fourth target range being one of the non-drive ranges other than the third target range.

With this configuration, in the case where the first and second backup contacts corresponding to the second target range are in the conductive state, the regular contact corresponding to the second target range is in the non-conductive state, and the regular contact corresponding to the third target range is in the conductive state, the control device detects that one of the non-drive ranges disallowing the vehicle to travel has been selected by the shift lever, as described above.

Thereafter, when the regular contact corresponding to the third target range makes a transition from the conductive state to the non-conductive state and the regular contact corresponding to the fourth target range makes a transition from the non-conductive state to the conductive state, it is hardly likely that, of the two regular contacts that have changed in state, one has broken and the other has short-circuited. Rather, it is likely that they have changed in state in accordance with the manipulation of the shift lever. Accordingly, the control device detects that the first backup contact and the second backup contact have both short-circuited. At this time, it is unnecessary for the change in state of the regular contact corresponding to the third target range and the change in state of the regular contact corresponding to the fourth target range to take place at the same time.

In this manner, the control device detects the relatively highly probable short circuits of the backup contacts. It is thus possible to prevent the undesirable event that the vehicle travels despite the fact that the driver has selected a non-drive range by the shift lever.

In the present invention, it is preferable that the third target range is a range in which wheels of the vehicle are locked, and the fourth target range is a range in which the wheels of the vehicle are not locked, and the control device preferably detects that the fourth target range has been selected by the shift lever in the case where the regular contact corresponding to the third target range has changed from the conductive state to the non-conductive state and the regular contact corresponding to the fourth target range has changed from the non-conductive state to the conductive state. With this configuration, when the control device detects that the range in which the vehicle wheels are not locked has been selected, it is unnecessary to perform the control of locking the vehicle wheels, leading to a faster control.

In the present invention, it is preferable that the position sensor further includes a control device, wherein when the first backup contact and the second backup contact corresponding to a fifth target range are in the conductive state, the fifth target range being one of the one or more prescribed ranges, and the regular contact corresponding to the fifth target range is in the non-conductive state, the control device detects that one of the non-drive ranges has been selected by the shift lever in the case where the regular contact corresponding to one of the ranges other than the one or more ranges to which the first and second backup contacts corresponding to the fifth target range correspond is in the conductive state, and the control device detects that the fifth target range has been selected by the shift lever in the case where the regular contact corresponding to the fifth target range has changed from the non-conductive state to the conductive state.

With this configuration, in the case where the first and second backup contacts corresponding to the fifth target range are in the conductive state, the regular contact corresponding to the fifth target range is in the non-conductive state, and the regular contact corresponding to any one of the ranges except the one or more ranges to which the first and second backup contacts corresponding to the fifth target range correspond (for example, in the case where first and second backup contacts common to two forward travel ranges are provided, the regular contact corresponding to any range other than these two ranges) is in the conductive state, then the control device detects that one of the non-drive ranges disallowing the vehicle to travel has been selected by the shift lever, as described above.

Thereafter, when the regular contact corresponding to the fifth target range attains the conductive state, the control device detects that the fifth target range has been selected by the shift lever, determining that the regular contact in the conductive state that corresponds to the range other than the one or more ranges to which the first and second backup contacts corresponding to the fifth target range correspond has short-circuited.

With this configuration, in the case where the first and second backup contacts corresponding to the fifth target range have both short-circuited, when all the regular contacts temporarily attain the non-conductive state at the time when the regular contact that should attain the conductive state is switched by the manipulation of the shift lever, only the first and second backup contacts that have short-circuited are in the conductive state. Thus, in consideration of such a case, when the three contacts (regular contact, first backup contact, and second backup contact) corresponding to the fifth target range all attain the conductive state, the control device detects that the fifth target range has been selected. This can cause the vehicle to travel when it is highly likely that a drive range has been selected.

DESCRIPTION OF THE PREFERRED EMBODIMENTS

Figure 1:
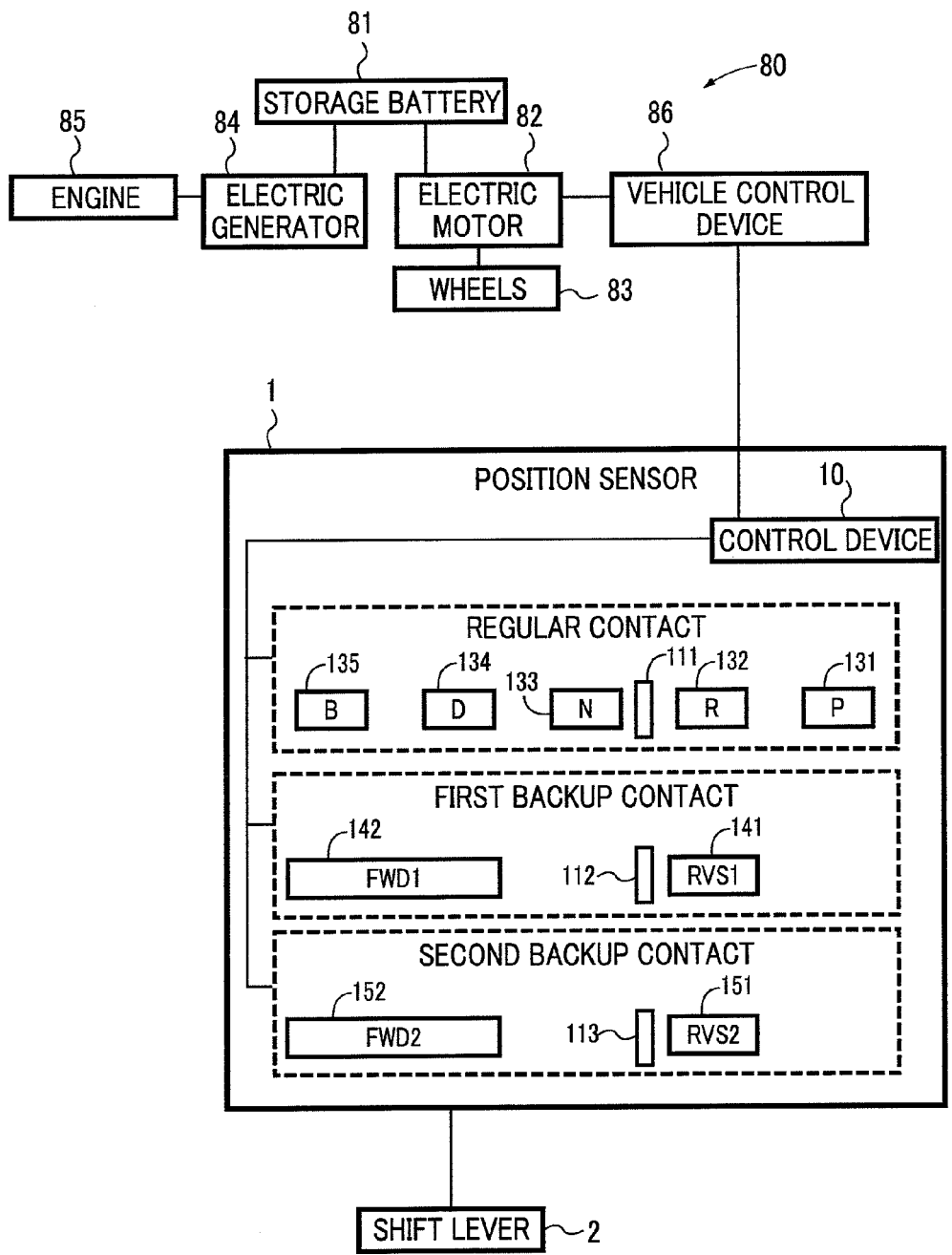
FIG. 1 shows a vehicle including a position sensor according to an embodiment of the present invention.

A position sensor according to an embodiment of the present invention will now be described. FIG. 1 is a block diagram illustrating the configuration of a vehicle 80 mounted with a position sensor 1. The vehicle 80 includes the position sensor 1, a shift lever 2, a storage battery 81, an electric motor 82, wheels 83, an electric generator 84, an engine 85, and a vehicle control device 86.

The shift lever 2 is arranged so as to be operable by a driver of the vehicle 80 during driving, allowing the driver to select one of five ranges set in the vehicle 80, i.e. parking P, reverse R, neutral N, drive D, and brake B, which will be described later.

The position sensor 1 includes a control device 10. The control device 10 includes a central processing unit (not shown) which executes various arithmetic processing, and a storage unit (not shown) including a ROM and RAM which store various arithmetic programs executed by the central processing unit, various tables, results of the arithmetic processing, and so on.

The control device 10 detects the range selected by the shift lever 2, and outputs an electric signal corresponding to the selected range to the outside of the position sensor 1. The detection of the range by the control device 10 will be described later in detail.

The storage battery 81 is configured as a secondary battery. The electric motor 82 is configured to rotate an output shaft (not shown) in a forward or reverse direction by the electric power supplied from the storage battery 81. The vehicle 80 runs as the rotation of the output shaft of the electric motor 82 is transmitted to the wheels 83 via a speed reducer (not shown) or the like. Hereinafter, to rotate the output shaft of the electric motor 82 in the forward direction will be referred to as "to drive the electric motor 82 forward", and to rotate the output shaft of the electric motor 82 in the reverse direction will be referred to as "to drive the electric motor 82 reversely".

The electric generator 84 is configured with a generator motor. The electric generator 84 has its input shaft (not shown) connected to an output shaft (not shown) of the engine 85. As the input shaft of the electric generator 84 is rotated by the engine 85, the electric generator 84 generates electricity, and supplies the generated electricity to the storage battery 81. The storage battery 81 can store the electricity therein.

The vehicle control device 86 includes a central processing unit (not shown) which executes various arithmetic processing, and a storage unit (not shown) including a ROM and RAM which store various arithmetic programs executed by the central processing unit, various tables, results of the arithmetic processing, and so on. The vehicle control device 86 receives an output signal (an electric signal corresponding to the range selected by the shift lever 2) from the position sensor 1 (or the control device 10). The vehicle control device 86 controls the electric motor 82 or various units in the vehicle 80 in accordance with the received signal.

When the vehicle control device 86 determines, on the basis of the signal received from the position sensor 1, which range has been selected by the shift lever 2, the vehicle control device 86 controls the electric motor 82 or the units in the vehicle 80 in the following manner:

(1) When the vehicle control device 86 receives a signal indicating that neutral N has been selected by the shift lever 2, the vehicle control device 86 interrupts the transmission of the driving force of the electric motor 82 to the wheels 83.

(2) When the vehicle control device 86 receives a signal indicating that parking P has been selected by the shift lever 2, the vehicle control device 86 interrupts the transmission of the driving force of the electric motor 82 to the wheels 83, as in the case of receiving the signal indicating that neutral N has been selected. In addition thereto, the vehicle control device 86 mechanically locks the wheels 83 by engaging a parking gear (not shown) with a parking pawl (not shown).

Herein, parking P corresponds to the "range in which the vehicle wheels are locked" in the present invention, and neutral N corresponds to the "range in which the vehicle wheels are not locked" in the present invention.

(3) When the vehicle control device 86 receives a signal indicating that drive D has been selected by the shift lever 2, the vehicle control device 86 drives the electric motor 82 forward, in accordance with the manipulated variable of the accelerator pedal (not shown) of the vehicle 80, to thereby cause the vehicle 80 to travel forward.

(4) When the vehicle control device 86 receives a signal indicating that brake B has been selected by the shift lever 2, the vehicle control device 86 drives the electric motor 82 forward, in accordance with the manipulated variable of the accelerator pedal of the vehicle 80, to thereby cause the vehicle 80 to travel forward, as in the case of receiving the signal indicating that drive D has been selected. In addition thereto, "when the accelerator pedal of the vehicle 80 is released (with the accelerator opening being 0 or almost 0", or "when the brake pedal (not shown) of the vehicle 80 is depressed", the vehicle control device 86 controls such that the amount of regeneration increases compared to the case where drive D has been selected.

Here, "regeneration" refers to the process of generating electricity using the driving force transmitted to the output shaft of the electric motor 82 from the wheels 83 that are rotated while the vehicle is moving under its own inertia, and storing the generated electricity in the storage battery 81. That is, with the regeneration, the kinetic energy of the running vehicle 80 is converted to electric energy, resulting in a braking force applied to the vehicle 80. Further, to control "such that the amount of regeneration increases" means to increase the braking force by the regeneration, or to increase the ratio of the "braking force applied by the regeneration" to the "braking force applied by the mechanical braking unit mounted on the vehicle 80".

(5) When the vehicle control device 86 receives a signal indicating that reverse R has been selected by the shift lever 2, the vehicle control device 86 drives the electric motor 82 reversely, in accordance with the manipulated variable of the accelerator pedal of the vehicle 80, to cause the vehicle 80 to travel backward.

As described above, the vehicle 80 of the present embodiment has three ranges of reverse R, drive D, and brake B which are drive ranges for driving, and two ranges of parking P and neutral N which are non-drive ranges for stopping. Of the drive ranges, drive D and brake B are forward travel ranges, and reverse R is a backward travel range.

The detailed structure of the position sensor 1 will now be described with reference to FIG. 2. The position sensor 1 includes, as electric contacts, three movable contacts 111-113 and nine fixed contacts 131-135, 141, 142, 151, and 152.

The three movable contacts 111-113 are attached to a substrate (not shown) which is mechanically connected to the shift lever 2 with wire (not shown). Therefore, as the shift lever 2 is manipulated, the substrate is moved by means of the wire, and correspondingly, the movable contacts 111-113 move while maintaining the relative positional relationship with each other. The movable contacts 111-113 are each configured as a rectangular metal plate having its longitudinal direction perpendicular to the direction in which they are movable. The movable contacts 111-113 are arranged spaced apart from each other in the direction perpendicular to the movable direction thereof. The three movable contacts 111-113 are: a regular movable contact 111 which constitutes part of the regular contact of the present invention; a first backup movable contact 112 which constitutes part of the first backup contact of the present invention; and a second backup movable contact 113 which constitutes part of the second backup contact of the present invention.

The nine fixed contacts 131-135, 141, 142, 151, and 152 are attached to a substrate (not shown) which is fixedly secured to a part of a member constituting the vehicle 80. When one or more of these fixed contacts come into contact with any of the movable contacts 111-113, the fixed and movable contacts that have come into contact with each other become conductive (or, they are electrically connected with each other).

As the movable contacts 111-113 move in correspondence with the movement of the shift lever 2, one or more of the nine fixed contacts 131-135, 141, 142, 151, and 152 conductive with the movable contacts change. In other words, in accordance with the position of the shift lever 2, the positions of the movable contacts 111-113 are determined, and correspondingly, the one or more fixed contacts that become conductive with the movable contacts at the positions are determined. Accordingly, it is possible to detect the range selected by the shift lever 2 on the basis of the fixed contact(s) that is/are conductive with the movable contact(s). Hereinafter, the state in which a fixed contact is conductive with a movable contact will be referred to as the "conductive state", and the state in which a fixed contact is not conductive with a movable contact will be referred to as the "non-conductive state".

The nine fixed contacts 131-135, 141, 142, 151, and 152 are roughly classified as: "five regular fixed contacts 131-135" which constitute part of the regular contact of the present invention; "two first backup fixed contacts 141 and 142" which constitute part of the first backup contact of the present invention; and "two second backup fixed contacts 151 and 152" which constitute part of the second backup contact of the present invention.

Here, the regular movable contact 111 that moves in correspondence with the movement of the shift lever 2 is configured to become conductive with one of the regular fixed contacts 131-135. Hereinafter, the state where a parking-specific fixed contact 131 is conductive with the regular movable contact 111 is referred to as "PON", the state where the parking-specific fixed contact 131 is not conductive with the regular movable contact 111 is referred to as "POFF", the state where a reverse-specific fixed contact 132 is conductive with the regular movable contact 111 is referred to as "RON", the state where the reverse-specific fixed contact 132 is not conductive with the regular movable contact 111 is referred to as "ROFF", the state where a neutral-specific fixed contact 133 is conductive with the regular movable contact 111 is referred to as "NON", the state where the neutral-specific fixed contact 133 is not conductive with the regular movable contact 111 is referred to as "NOFF", the state where a drive-specific fixed contact 134 is conductive with the regular movable contact 111 is referred to as "DON", the state where the drive-specific fixed contact 134 is not conductive with the regular movable contact 111 is referred to as "DOFF", the state where a brake-specific fixed contact 135 is conductive with the regular movable contact 111 is referred to as "BON", and the state where the brake-specific fixed contact 135 is not conductive with the regular movable contact 111 is referred to as "BOFF".

The first backup movable contact 112 that moves in correspondence with the movement of the shift lever 2 is configured to become conductive with one of the first backup fixed contacts 141 and 142. Hereinafter, the state where a first backward-travel-specific backup fixed contact 141 is conductive with a first backup movable contact 112 is referred to as "R1ON", the state where the first backward-travel-specific backup fixed contact 141 is not conductive with the first backup movable contact 112 is referred to as "R1OFF", the state where a first forward-travel-specific backup fixed contact 142 is conductive with the first backup movable contact 112 is referred to as "F1ON", and the state where the first forward-travel-specific backup fixed contact 142 is not conductive with the first backup movable contact 112 is referred to as "F1OFF".

The second backup movable contact 113 that moves in correspondence with the movement of the shift lever 2 is configured to become conductive with one of the second backup fixed contacts 151 and 152. Hereinafter, the state where a second backward-travel-specific backup fixed contact 151 is conductive with the second backup movable contact 113 is referred to as "R2ON", the state where the second backward-travel-specific backup fixed contact 151 is not conductive with the second backup movable contact 113 is referred to as "R2OFF", the state where a second forward-travel-specific backup fixed contact 152 is conductive with the second backup movable contact 113 is referred to as "F2ON", and the state where the second forward-travel-specific backup fixed contact 152 is not conductive with the second backup movable contact 113 is referred to as "F2OFF".

The five regular fixed contacts 131-135 correspond respectively to the ranges P, R, N, D, and B set in the vehicle 80. As shown in FIG. 2, the regular fixed contacts 131-135 are arranged linearly, spaced apart from each other, in order of: "the parking-specific fixed contact 131, which is the contact corresponding to parking P" → "the reverse-specific fixed contact 132, which is the contact corresponding to reverse R" → "the neutral-specific fixed contact 133, which is the contact corresponding to neutral N" → "the drive-specific fixed contact 134, which is the contact corresponding to drive D" → "the brake-specific fixed contact 135, which is the contact corresponding to brake B". Each of the five regular fixed contacts 131-135 is formed as a rectangular metal plate having its longitudinal direction corresponding to the direction in which they are arranged.

The five regular fixed contacts 131-135 are designed to have contact lengths of LP, LR, LN, LD, and LB, respectively. At this time, the five regular fixed contacts 131-135 are configured to have minimum allowable sizes (the shortest allowable lengths) LPmin, LRmin, LNmin, LDmin, and LBmin and maximum allowable sizes (the longest allowable lengths) LPmax, LRmax, LNmax, LDmax, and LBmax, respectively, for the contact lengths that vary due to manufacturing errors (i.e. the difference between "the designed length of a contact" and "the actual length of the manufactured contact").

The two first backup fixed contacts 141 and 142 correspond to the drive ranges R, D, and B among the five ranges to which the regular fixed contacts 131-135 respectively correspond. The two first backup fixed contacts 141 and 142 are arranged parallel to the direction in which the regular fixed contacts 131-135 are arranged, spaced apart from the regular fixed contacts 131-135 in the direction normal to the direction in which the regular fixed contacts 131-135 are arranged. The first backup fixed contacts 141 and 142 are arranged linearly, spaced apart from each other, in order from right to left in FIG. 2 of: "the first backward-travel-specific backup fixed contact 141, which is the contact corresponding to the backward travel range R" → "the first forward-travel-specific backup fixed contact 142, which is the contact corresponding to the forward travel ranges D and B". Each of the first backup fixed contacts 141 and 142 is formed as a rectangular metal plate having its longitudinal direction corresponding to the direction in which they are arranged.

The two first backup fixed contacts 141 and 142 are designed to have lengths LR1 and LF1, respectively, with minimum allowable sizes LR1min and LF1min and maximum allowable sizes LR1max and LF1max, respectively.

The two second backup fixed contacts 151 and 152 correspond to the drive ranges R, D, and B among the five ranges to which the regular fixed contacts 131-135 respectively correspond, similarly as the first backup fixed contacts 141 and 142. The two second backup fixed contacts 151 and 152 are arranged parallel to the direction in which the regular fixed contacts 131-135 and the first backup fixed contacts 141 and 142 are arranged, on the side of the first backup fixed contacts 141 and 142 opposite to the side on which the regular fixed contacts 131-135 are arranged, spaced apart from the first backup fixed contacts 141 and 142 in the direction normal to the direction in which the first backup fixed contacts 141 and 142 are arranged. The second backup fixed contacts 151 and 152 are arranged linearly, spaced apart from each other, in order from right to left in FIG. 2 of: "the second backward-travel-specific backup fixed contact 151, which is the contact corresponding to the backward travel range R" → "the second forward-travel-specific backup fixed contact 152, which is the contact corresponding to the forward travel ranges D and B". Each of the second backup fixed contacts 151 and 152 is formed as a rectangular metal plate having its longitudinal direction corresponding to the direction in which they are arranged.

The two second backup fixed contacts 151 and 152 are designed to have lengths LR2 and LF2, respectively, with minimum allowable sizes LR2min and LF2min and maximum allowable sizes LR2max and LF2max, respectively.

The first backward-travel-specific backup fixed contact 141 and the second backward-travel-specific backup fixed contact 151 have their lengths set to satisfy: "LR1min≥LRmax" and "LR2min≥LRmax". Further, these contacts 141 and 151 are arranged such that their left ends in FIG. 2 are placed farther to the left than the left end of the reverse-specific fixed contact 132 and their right ends are placed farther to the right than the right end of the reverse-specific fixed contact 132 when the reverse-specific fixed contact 132 has the maximum allowable size LRmax.

It is noted that the contacts 141 and 151 may be arranged such that their left ends are aligned with the left end of the reverse-specific fixed contact 132 when the contact 132 has the maximum allowable size LRmax, or the contacts 141 and 151 may be arranged such that their right ends are aligned with the right end of the reverse-specific fixed contact 132 when the contact 132 has the maximum allowable size LRmax. At this time, the contacts 141 and 151 may be arranged such that their left and right ends are both aligned with the corresponding ends of the reverse-specific fixed contact 132. In this case, when the first backward-travel-specific backup fixed contact 141 or the second backward-travel-specific backup fixed contact 151 has the minimum allowable size (LR1min or LR2min), the both ends of that backup contact (141 or 151) having the minimum allowable size are aligned with the corresponding ends of the reverse-specific fixed contact 132 having the maximum allowable size LRmax (i.e., they have the same lengths).

Figure 2:
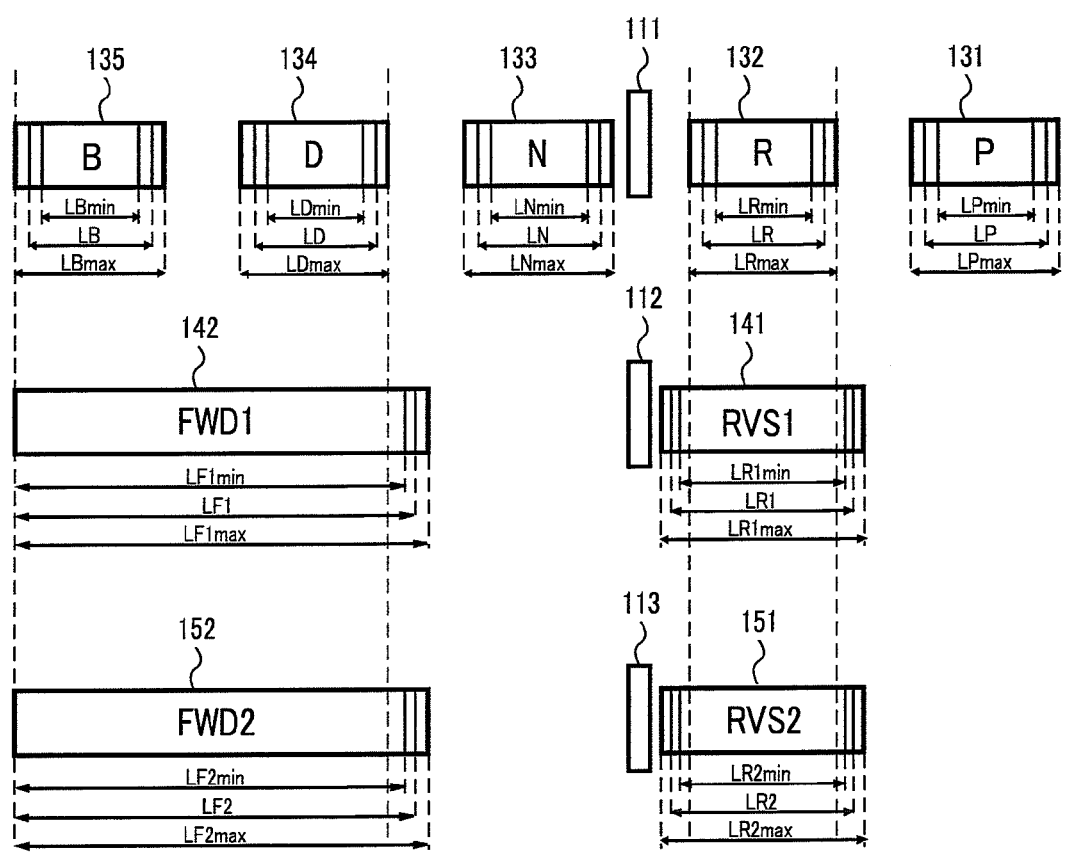
FIG. 2 illustrates the structures of contacts in the position sensor.

The first forward-travel-specific backup fixed contact 142 and the second forward-travel-specific backup fixed contact 152 are arranged such that their left ends in FIG. 2 are aligned with the left end of the brake-specific fixed contact 135 and their right ends are placed farther to the right than the right end of the drive-specific fixed contact 134 when the drive-specific fixed contact 134 has the maximum allowable size LDmax.

It is noted that the contacts 142 and 152 may be arranged such that their right ends are aligned with the right end of the drive-specific fixed contact 134 when the contact 134 has the maximum allowable size LDmax. At this time, when the first forward-travel-specific backup fixed contact 142 or the second forward-travel-specific backup fixed contact 152 has the minimum allowable size (LF1min or LF2min), the right end of that backup contact (142 or 152) having the minimum allowable size is aligned with the right end of the drive-specific fixed contact 134 having the maximum allowable size LDmax.

The above-described configurations of the movable contacts 111-113 and the fixed contacts 131-135, 141, 142, 151, and 152 ensure that the first backup fixed contact 141 or 142 and the second backup fixed contact 151 or 152 are conductive respectively with the first backup movable contact 112 and the second backup movable contact 113, without fail, when the regular fixed contact (132, or 134, 135) for the corresponding range (R, or D, B) becomes conductive with the regular movable contact 111.

More specifically, in the case where the regular movable contact 111 moves from the parking-specific fixed contact 131 side or the neutral-specific fixed contact 133 side toward the reverse-specific fixed contact 132 in accordance with the manipulation of the shift lever 2, the conductive states are established in the following order: "R1ON and R2ON, and then RON", or "R1ON, R2ON, and RON at the same timing". As such, the lengths and arrangement of the contacts are set to prevent the RON state from preceding the R1ON and R2ON states.

Further, in the case where the regular movable contact 111 moves from the reverse-specific fixed contact 132 side toward the parking-specific fixed contact 131 or the neutral-specific fixed contact 133 in accordance with the manipulation of the shift lever 2, the non-conductive states are established in the following order: "ROFF, and then R1OFF and R2OFF", or "ROFF, R1OFF, and R2OFF at the same timing". As such, the lengths and arrangement of the contacts are set to prevent the R1OFF and R2OFF states from preceding the ROFF state.

Similarly, in the case where the regular movable contact 111 moves from the neutral-specific fixed contact 133 side toward the drive-specific fixed contact 134 in accordance with the manipulation of the shift lever 2, the conductive states are established in the following order: "F1ON and F2ON, and then DON", or "F1ON, F2ON, and DON at the same timing". As such, the lengths and arrangement of the contacts are set to prevent the DON state from preceding the F1ON and F2ON states.

Further, in the case where the regular movable contact 111 moves from the drive-specific fixed contact 134 side toward the neutral-specific fixed contact 133 in accordance with the manipulation of the shift lever 2, the non-conductive states are established in the following order: "DOFF, and then F1OFF and F2OFF", or "DOFF, F1OFF, and F2OFF at the same timing". As such, the lengths and arrangement of the contacts are set to prevent the F1OFF and F2OFF states from preceding the DOFF state.

As described above, in the position sensor 1 of the present embodiment, the first backup fixed contacts 141, 142 and the second backup fixed contacts 151, 152 are made longer compared to the regular fixed contacts 131-135. Therefore, in the case where a prescribed range is selected by the shift lever 2, when the regular contact corresponding to the prescribed range is in the conductive state, the backup contacts corresponding to the prescribed range are in the conductive state without fail. With this configuration, the position sensor 1 is able to check for abnormalities in the contacts as accurate as possible.

Here, the drive ranges R, D, and B in the present embodiment correspond to the "prescribed ranges" in the present invention. Further, the settings of the lengths and arrangement of the regular fixed contacts 131-135, the first backup fixed contacts 141, 142, and the second backup fixed contacts 151, 152 in the present embodiment correspond to the following statement in the present invention: "each of the one or more backup contacts is configured such that the backup contact makes a transition from a non-conductive state to a conductive state before the regular contact corresponding to the same range as the backup contact makes a transition from a non-conductive state to a conductive state, and such that the backup contact makes a transition from a conductive state to a non-conductive state after the regular contact corresponding to the same range as the backup contact makes a transition from a conductive state to a non-conductive state, the non-conductive state being the state where the movable contact is not conductive with the fixed contact, the conductive state being the state where the movable contact is conductive with the fixed contact".

Description will now be made as to how the control device 10 determines (detects) the range being selected by the shift lever 2.

In the case where at least two of the three contacts corresponding to reverse R, i.e. the reverse-specific fixed contact 132, the first backward-travel-specific backup fixed contact 141, and the second backward-travel-specific backup fixed contact 151, are in the conductive state and the rest fixed contacts (131, 133, 134, 135, 142, and 152) are in the non-conductive state, the control device 10 determines that reverse R has been selected by the shift lever 2.

Further, in the case where the three contacts of the reverse-specific fixed contact 132, the first backward-travel-specific backup fixed contact 141, and the second backward-travel-specific backup fixed contact 151 are in the conductive state, even if one of the rest fixed contacts (131, 133, 134, 135, 142, and 152) is in the conductive state, the control device 10 determines that reverse R has been selected by the shift lever 2.

In the case where at least two of the three contacts of the drive-specific fixed contact 134, the first forward-travel-specific backup fixed contact 142, and the second forward-travel-specific backup fixed contact 152 are in the conductive state and the rest fixed contacts (131, 132, 133, 135, 141, and 151) are in the non-conductive state, the control device 10 determines that drive D has been selected by the shift lever 2.

Further, in the case where the three contacts of the drive-specific fixed contact 134, the first forward-travel-specific backup fixed contact 142, and the second forward-travel-specific backup fixed contact 152 are in the conductive state, even if one of the rest fixed contacts (131, 132, 133, 135, 141, and 151) is in the conductive state, the control device 10 determines that drive D has been selected by the shift lever 2.

In the case where at least two of the three contacts of the brake-specific fixed contact 135, the first forward-travel-specific backup fixed contact 142, and the second forward-travelspecific backup fixed contact 152 are in the conductive state and the rest fixed contacts (131, 132, 133, 134, 141, and 151) are in the non-conductive state, the control device 10 determines that brake B has been selected by the shift lever 2. However, in the case where only the first forward-travel-specific backup fixed contact 142 and the second forward-travel-specific backup fixed contact 152 are in the conductive state, the control device 10 of the present embodiment determines that drive D has been selected, although the control device 10 may be configured to determine that brake B has been selected when these two contacts alone are in the conductive state.

Further, in the case where the three contacts of the brake-specific fixed contact 135, the first forward-travel-specific backup fixed contact 142, and the second forward-travel-specific backup fixed contact 152 are in the conductive state and one of the fixed contacts (131, 132, 133, 141, and 151) excluding the above three contacts and the drive-specific fixed contact 134 is in the conductive state, then the control device 10 determines that brake B has been selected by the shift lever 2.

It is noted that in the case where the drive-specific fixed contact 134, the first forward-travel-specific backup fixed contact 142, and the second forward-travel-specific backup fixed contact 152 are in the conductive state, when the brake-specific fixed contact 135 is in the conductive state as well, then the control device 10 may determine that brake B has been selected by the shift lever 2. The determination as to which one of drive D and brake B has been selected by the shift lever 2 in this case may be made as appropriate in accordance with the merchantability, running state, and other conditions of the vehicle 80.

In the case where the three fixed contacts corresponding to the backward travel range R, i.e. the reverse-specific fixed contact 132, the first backward-travel-specific backup fixed contact 141, and the second backward-travel-specific backup fixed contact 151, are in the conductive state and two of the four fixed contacts corresponding to the forward travel ranges D, B, i.e. the drive-specific fixed contact 134, the brake-specific fixed contact 135, the first forward-travel-specific backup fixed contact 142, and the second forward-travel-specific backup fixed contact 152, are in the conductive state, then the control device 10 determines that neutral N has been selected by the shift lever 2.

In this case, while the control device 10 of the position sensor 1 of the present embodiment determines that neutral N has been selected by the shift lever 2, the determination to be made is not limited thereto. The control device 10 may determine that reverse R has been selected by the shift lever 2 because the three contacts (132, 141, and 151) are in the conductive state.

In the case where three of the four fixed contacts corresponding to the forward travel ranges D, B, i.e. the drive-specific fixed contact 134, the brake-specific fixed contact 135, the first forward-travel-specific backup fixed contact 142, and the second forward-travel-specific backup fixed contact 152, are in the conductive state and two of the three fixed contacts corresponding to the backward travel range R, i.e. the reverse-specific fixed contact 132, the first backward-travel-specific backup fixed contact 141, and the second backward-travel-specific backup fixed contact 151, are in the conducive state, the control device 10 determines that neutral N has been selected by the shift lever 2.

In this case, while the control device 10 of the position sensor 1 of the present embodiment determines that neutral N has been selected by the shift lever 2, the determination to be made is not limited thereto. For example, in the case where the three contacts of the drive-specific fixed contact 134, the first forward-travel-specific backup fixed contact 142, and the second forward-travel-specific backup fixed contact 152 are in the conductive state and two of the three contacts of the reverse-specific fixed contact 132, the first backward-travel-specific backup fixed contact 141, and the second backward-travel-specific backup fixed contact 151 are in the conductive state, the control device 10 may determine that drive D has been selected by the shift lever 2. Similarly, in the case where the three contacts of the brake-specific fixed contact 135, the first forward-travel-specific backup fixed contact 142, and the second forward-travel-specific backup fixed contact 152 are in the conductive state and two of the three contacts of the reverse-specific fixed contact 132, the first backward-travel-specific backup fixed contact 141, and the second backward-travel-specific backup fixed contact 151 are in the conductive state, the control device 10 may determine that brake B has been selected by the shift lever 2.

In the case where the first backward-travel-specific backup fixed contact 141 and the second backward-travel-specific backup fixed contact 151 are both in the conductive state and the neutral-specific fixed contact 133 is in the conductive state, the control device 10 determines that neutral N has been selected by the shift lever 2. In this case, while the control device 10 of the position sensor 1 of the present embodiment determines that neutral N has been selected by the shift lever 2, the determination to be made is not limited thereto; the control device 10 may determine that parking P has been selected.

Further, in the state where the first backward-travel-specific backup fixed contact 141 and the second backward-travel-specific backup fixed contact 151 are in the conductive state, when the parking-specific fixed contact 131 changes from the conductive state to the non-conductive state and the neutral-specific fixed contact 133 changes to the conductive state, then the control device 10 determines that the first backward-travel-specific backup fixed contact 141 and the second backward-travel-specific backup fixed contact 151 have both short-circuited.

Further, in the case where the reverse-specific fixed contact 132, the first backward-travel-specific backup fixed contact 141, and the second backward-travel-specific backup fixed contact 151 are in the conductive state, even if one of the parking-specific fixed contact 131 and the neutral-specific fixed contact 133 is in the conductive state, the control device 10 determines that reverse R has been selected by the shift lever 2.

In the case where two of the four contacts of the drive-specific fixed contact 134, the brake-specific fixed contact 135, the first forward-travel-specific backup fixed contact 142, and the second forward-travel-specific backup fixed contact 152 are in the conductive state and one of the parking-specific fixed contact 131 and the neutral-specific fixed contact 133 is in the conductive state, the control device 10 determines that neutral N has been selected by the shift lever 2. In this case, while the control device 10 of the position sensor 1 of the present embodiment determines that neutral N has been selected by the shift lever 2, the determination to be made is not limited thereto; the control device may determine that parking P has been selected.

Further, in the case where the drive-specific fixed contact 134, the first forward-travel-specific backup fixed contact 142, and the second forward-travel-specific backup fixed contact 152 are in the conductive state, even if one of the parking-specific fixed contact 131 and the neutral-specific fixed contact 133 is in the conductive state, the control device 10 determines that drive D has been selected by the shift lever 2. Similarly, in the case where the brake-specific fixed contact 135, the first forward-travel-specific backup fixed contact 142, and the second forward-travel-specific backup fixed contact 152 are in the conductive state, even if one of the parking-specific fixed contact 131 and the neutral-specific fixed contact 133 is in the conductive state, the control device 10 determines that brake B has been selected by the shift lever 2.

In the case where the first backward-travel-specific backup fixed contact 141 and the second backward-travel-specific backup fixed contact 151 are in the conductive state and the parking-specific fixed contact 131 is in the conductive state, when the neutral-specific fixed contact 133 changes to the conductive state within a predetermined time (for example, 10 [msec]) after the manipulation of the shift lever 2, the control device 10 determines that neutral N has been selected by the shift lever 2.

In the case where the first forward-travel-specific backup fixed contact 142 and the second forward-travel-specific backup fixed contact 152 are in the conductive state and the parking-specific fixed contact 131 is in the conductive state, when the neutral-specific fixed contact 133 changes to the conductive state within a predetermined time (for example, 10 [msec]) after the manipulation of the shift lever 2, the control device 10 determines that neutral N has been selected by the shift lever 2.

In the case where the first backward-travel-specific backup fixed contact 141 and the second backward-travel-specific backup fixed contact 151 are in the conductive state and one of the parking-specific fixed contact 131, the neutral-specific fixed contact 133, the drive-specific fixed contact 134, and the brake-specific fixed contact 135 is in the conductive state, the control device 10 determines that neutral N has been selected by the shift lever 2. At this time, the control device 10 may determine that parking P has been selected by the shift lever 2 instead.

Following this state, when the regular contact (131, 133, 134, or 135) that was in the conductive state changes to the non-conductive state and the reverse-specific contact 132 changes to the conductive state, then the control device 10 determines that reverse R has been selected by the shift lever 2.

In the case where the first forward-travel-specific backup fixed contact 142 and the second forward-travel-specific backup fixed contact 152 are in the conductive state and one of the parking-specific fixed contact 131, the reverse-specific fixed contact 132, and the neutral-specific fixed contact 133 is in the conductive state, the control device 10 determines that neutral N has been selected by the shift lever 2, although the control device 10 may determine that parking P has been selected by the shift lever 2 instead.

Following this state, when the regular contact (131, 132, or 133) that was in the conductive state changes to the non-conductive state and one of the drive-specific contact 134 and the brake-specific contact 135 changes to the conductive state, then the control device 10 determines that the range (drive D or brake B) corresponding to the contact (134 or 135) that has attained the conductive state has been selected by the shift lever 2.

While the fixed contacts 131-135, 141, 142, 151, and 152 were arranged linearly in the present embodiment, the arrangement is not limited thereto. For example, the fixed contacts 131-135, 141, 142, 151, and 152 may be arranged along an arc of a fan-shape, and the movable contacts 111-113 may be configured to move along the arc. In this case, when the contacts are arranged in different distances from the center of the circle having the arc as a segment of the circumference thereof, in such a manner that the regular contact is arranged on the outermost side, the first backup contact is arranged on the inner side thereof, and the second backup contact is arranged on the innermost side, then the movable contacts 111-113 closer to the center of the arc have shorter moving distances. Thus, the fixed contacts for the first and second backup contacts do not necessarily have to be made longer than the regular fixed contacts 131-135 as in the present embodiment. Even in such a case, the following condition is satisfied: "in the case where a prescribed range is selected by the shift lever, when the regular contact corresponding to the prescribed range is in the conductive state, the backup contacts corresponding to the prescribed range are in the conductive state without fail".

Further, the configurations of the regular contact, the first backup contact, and the second backup contact are not limited to those in the present embodiment. For example, the regular fixed contacts, the first backup fixed contacts and the second backup contacts may be arranged in a mixed manner with respect to the moving direction of the movable contacts. In this case, for example, the regular fixed contacts, the first backup fixed contacts and the second backup fixed contacts may be all arranged on a single straight line. Also, a plurality of movable contacts may be provided in a direction orthogonal to the moving direction of the movable contacts, and the regular fixed contacts, the first backup fixed contacts and the second backup fixed contacts may be arranged in a mixed manner.

Further, the types of the ranges are not limited to those in the present embodiment. For example, brake B may be replaced with low L or second 2 as a second drive range for forward travel.

Furthermore, while the vehicle of the present embodiment is a series hybrid vehicle, the vehicle type is not limited thereto. The position sensor of the present invention is applicable to any type of vehicle as long as it includes a transmission having a plurality of ranges and the range selected by a shift lever is detected using electric contacts.

What is claimed is:

1. A position sensor comprising a shift lever manipulated to select one of a plurality of ranges, and a plurality of contacts corresponding to the plurality of ranges, the plurality of contacts including movable contacts and fixed contacts, the movable contact being configured to move in accordance with the manipulation of the shift lever, the fixed contact becoming conductive with the movable contact when the movable contact moves and comes into contact with the fixed contact, the position sensor detecting that the range corresponding to the movable and fixed contacts that have become conductive with each other has been selected by the shift lever, wherein
the plurality of contacts are classified as one or more regular contacts and one or more backup contacts that are different from the regular contacts, the regular contacts corresponding respectively to the plurality of ranges, the backup contacts corresponding respectively to one or more prescribed ranges among the plurality of ranges,
each of the one or more backup contacts is configured such that the backup contact makes a transition from a non-conductive state to a conductive state before the regular contact corresponding to the same range as the backup contact makes a transition from the non-conductive state to the conductive state, and such that the backup contact makes a transition from the conductive state to the non-conductive state after the regular contact corresponding to the same range as the backup contact makes a transition from the conductive state to the non-conductive state, the non-conductive state being a state where the movable contact is not conductive with the fixed contact, the conductive state being the state where the movable contact is conductive with the fixed contact, and in a range where the corresponding backup contact exists among the plurality of ranges, when the regular contact corresponding to the range is in the conductive state and the backup contact corresponding to the range is in the non-conductive state, configured to detect that at least one of the regular contact and the backup contact corresponding to the range has abnormality.

2. The position sensor according to claim 1, wherein each of the one or more backup contacts includes a first backup contact and a second backup contact which correspond to one and same range.

3. The position sensor according to claim 2, wherein the ranges include at least two drive ranges used when the vehicle is caused to travel, and at least two non-drive ranges used when the vehicle is being stopped, and the prescribed ranges include only the drive ranges.

4. The position sensor according to claim 3, wherein when the first backup contact and the second backup contact corresponding to a first target range are in the conductive state, the first target range being one of the one or more prescribed ranges, and the regular contact corresponding to the first target range is in the non-conductive state, the position sensor is configured to detect that one of the non-drive ranges has been selected by the shift lever, in a case where the regular contact corresponding to one of the non-drive ranges is in the conductive state, and to detect that the first target range has been selected by the shift lever in a case where the regular contact corresponding to the first target range has made a transition from the non-conductive state to the conductive state.

5. The position sensor according to claim 3, wherein when the first backup contact and the second backup contact corresponding to a second target range are in the conductive state, the second target range being one of the one or more prescribed ranges, and the regular contact corresponding to the second target range is in the non-conductive state, the position sensor is configured to detect that one of the non-drive ranges has been selected by the shift lever in a case where the regular contact corresponding to a third target range is in the conductive state, the third target range being one of the non-drive ranges, and to detect that the first backup contact and the second backup contact corresponding to the second target range have abnormalities in a case where the regular contact corresponding to the third target range has made a transition from the conductive state to the non-conductive state and the regular contact corresponding to a fourth target range has made a transition from the non-conductive state to the conductive state, the fourth target range being one of the non-drive ranges other than the third target range.

6. The position sensor according to claim 5, wherein the third target range is a range in which wheels of the vehicle are locked, and the fourth target range is a range in which the wheels of the vehicle are not locked, and the position sensor is configured to detect that the fourth target range has been selected by the shift lever in the case where the regular contact corresponding to the third target range has changed from the conductive state to the non-conductive state and the regular contact corresponding to the fourth target range has changed from the non-conductive state to the conductive state.

7. The position sensor according to claim 3, wherein when the first backup contact and the second backup contact corresponding to a fifth target range are in the conductive state, the fifth target range being one of the one or more prescribed ranges, and the regular contact corresponding to the fifth target range is in the non-conductive state, the position sensor is configured to detect that one of the non-drive ranges has been selected by the shift lever in a case where the regular contact corresponding to one of the ranges other than the one or more ranges to which the first backup contact and the second backup contact corresponding to the fifth target range correspond is in the conductive state, and to detect that the fifth target range has been selected by the shift lever in a case where the regular contact corresponding to the fifth target range has changed from the non-conductive state to the conductive state.

* * * * *